United States Patent [19]

Osumi et al.

[11] Patent Number: 4,953,825
[45] Date of Patent: Sep. 4, 1990

[54] ELECTRO-MAGNETIC PROPORTIONAL FLOW CONTROL VALVE

[75] Inventors: Toru Osumi, Toyota; Shoji Ito, Nagoya; Kenji Hashimoto, Toyota, all of Japan

[73] Assignee: Aisin Seiki Kabushiki Kaisha, Kariya, Japan

[21] Appl. No.: 400,766

[22] Filed: Aug. 30, 1989

[30] Foreign Application Priority Data

Aug. 30, 1988 [JP] Japan ............................ 63-112799[U]

[51] Int. Cl.⁵ .............................................. F16K 31/06
[52] U.S. Cl. ........................... 251/129.17; 251/129.15; 251/129.07
[58] Field of Search .................... 251/129.07, 129.17, 251/129.15

[56] References Cited

U.S. PATENT DOCUMENTS

| | | | |
|---|---|---|---|
| 3,627,257 | 12/1971 | Stampfli | 251/129.07 |
| 4,830,332 | 5/1989 | Miura et al. | 251/129.07 |
| 4,858,886 | 8/1989 | Tatara | 251/129.07 |

FOREIGN PATENT DOCUMENTS 1109356  3/1968  United Kingdom ........... 251/129.07

*Primary Examiner*—Arnold Rosenthal
*Attorney, Agent, or Firm*—Oblon, Spivak, McClelland, Maier & Neustadt

[57] ABSTRACT

An electromagnetic proportional flow control valve includes an electromagnetic solenoid having a bobbin with an axial bore and a fixed core in the axial bore. A valve housing defines a first port, a second port and a valve seat fludically positioned between the first and second ports, while a valve is normally in a closing position for closing the valve seat and interrupting fluid communication between the first and second ports. A movable core is fixed to the valve and positioned relative to the electromagnetic solenoid such that the movable core is attracted to the fixed core upon excitation of the electromagnetic solenoid. As a result, the valve may move from the closing position upon excitation of the electromagnetic solenoid to fluidically communicate the first and second ports. An annular diaphragm is positioned between the valve and the electromagnetic solenoid and is sealingly mounted to the movable core so as to form a fluid tight pressure chamber on a side of the diaphragm opposite the valve. A passage in the movable core fluidically communicates the pressure chamber with the second port so that forces acting on the valve due to pressure differences across the valve are cancelled.

7 Claims, 1 Drawing Sheet

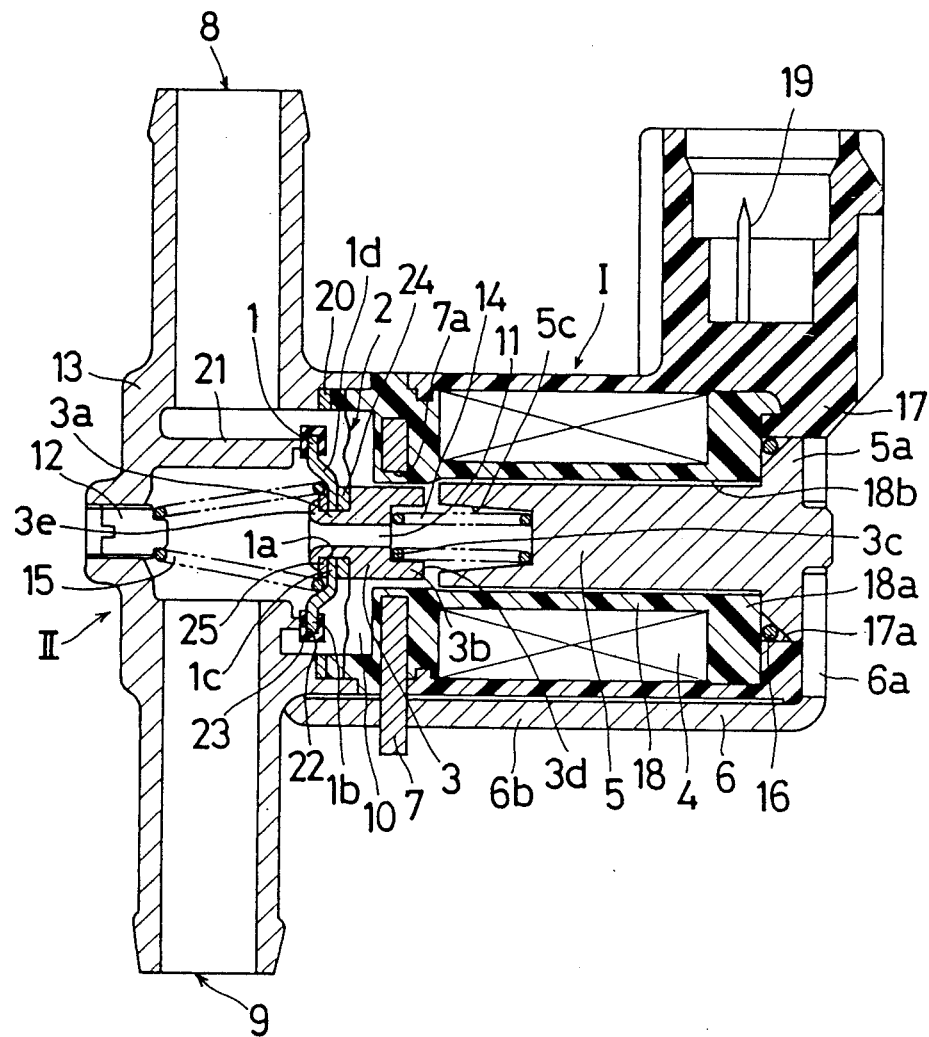

ELECTRO-MAGNETIC PROPORTIONAL FLOW CONTROL VALVE

BACKGROUND OF THE INVENTION

1. Field of the Invention

This invention relates to an electromagnetic proportional flow control valve for controlling the valve opening degree in proportion to the electromagnetic force (excitation current), and in particular to a valve of such type to be used for the fuel-air ratio control or the idle-rotation control of the engine of a vehicle.

2. Description of Prior Art

A conventional proportional flow control valve is disclosed in, for example, Japanese Utility Model Registration Publication No. 57-143459 which was published without examination on Sept. 8, 1982. In the conventional valve, for assuring the operation thereof with reliability, a pressure chamber is formed so as to cancel the opposite pressures applied to the valve member. For establishing the pressure chamber, a bellows is used and is disposed between the valve member and the housing. The valve member is supported on a lengthwise shaft which is moved by an electromagnetic solenoid in the axial direction.

However, for carrying the shaft, at least a pair of bearings have to be provided and the solenoid must have a sufficient power in light of the weight of the shaft itself and the friction between the shaft and each bearing. Further, for enduring repeated expansion and shrinkage, the bellows has to be made from polytetrafluoroethylene, which is very expensive.

SUMMARY OF THE INVENTION

It is an object the invention to provide an electromagnetic proportional flow control valve system for exactly guiding the axial movement of the valve, without the shaft, the bearings and the holes supporting the shaft.

It is another object of the invention to eliminate the hysteresis of the current-flow characteristic.

It is further another object of the invention to provide the small sized, light and cheap valve system.

It is yet another object of invention not to use a bellows made from polytetrafluoroethylene.

The above and other objects are accomplished according to the present invention by an electromagnetic proportional flow control valve including an electromagnetic solenoid having a bobbin with an axial bore and a fixed core in the axial bore. A valve housing defines a first port, a second port and a valve seat fluidically positioned between the first and second ports, while a valve is normally in a closing position for closing the valve seat and interrupting fluid communication between the first and second ports. A movable core is fixed to the valve and positioned relative to the electromagnetic solenoid such that the movable core is attracted to the fixed core upon excitation of the electromagnetic solenoid. As a result, the valve may move from the closing position upon excitation of the electromagnetic solenoid to fluidically communicate the first and second ports. An annular diaphragm is positioned between the valve and the electromagnetic solenoid and is sealingly mounted to the movable core so as to form a fluid tight pressure chamber on a side of the diaphragm opposite the valve. A passage in the movable core fluidically communicates the pressure chamber with the second port so that forces acting on the valve due to pressure differences across the valve are cancelled.

According to a further feature of the invention, the pressure chamber has an effective area equal to an effective area of the opening defined by the valve seat.

According to a further feature of the invention, the diaphragm is made of metal and is preferably a corrugated metal disc having a center hole.

According to yet a further feature of the invention, the outer circumference of the diaphragm is fixed relative to the axial bore of the bobbin, whereby the movable core is held in the axial bore and coaxial thereto by the diaphragm. As such, the movable core is supported only by the diaphragm and no bearings are necessary.

According to a further feature of the invention, an adjusting means for adjusting a force necessary for moving the valve from the closing position is in the form of a displaceable screw threaded in the valve housing, against which bears a spring which urges the valve away from the closing position.

BRIEF DESCRIPTION OF THE DRAWINGS

A more complete appreciation of the invention and many of the attendant advantages thereof will be readily obtained as the same becomes better understood by reference to the following detailed description when considered in connection with accompanying drawings, wherein:

The sole Figure shows a sectional view of the electromagnetic proportional flow control valve system of the invention.

DETAILED DESCRIPTION OF THE PREFERRED EMBODIMENT

In the single Figure, an electro-magnetic proportional flow control valve system comprises an electromagnetic drive part I and a flow control part II.

In the electro-magnetic drive part I, an electro-magnetic solenoid 4 has a coil held on a cylindrical outer surface of a bobbin 18 and is accommodated within a substantially cylindrical casing 17 made of non-magnetic material such as synthetic resin. The electro-magnetic solenoid 4 accepts an excitation current from a power source (not shown) via a connector 19 formed integrally with the casing 17. A flange 18a is formed on the connector side of the bobbin 18, and the electro-magnetic solenoid 4 and the bobbin 18 are fixed to the casing 17 via the flange 18a. A fixed or stationary core 5 made of a magnetic material is inserted in the center bore or hole 18b of the bobbin 18 from the side of the flange 18a for increasing the attracting force of the electro-magnetic solenoid, and a flange 5a is formed on the right end side of the fixed core 5 in the Figure. The flange 5a contacts the outer end of the flange 18a through an O-ring 16 so that the relationship between the solenoid 4 and the fixed core 5 is established without relative movement therebetween. The flange 5a is snugly fitted in a hole 17a formed on the right end side of the casing 17 in Figure.

A yoke 6 with an L-shaped cross-section which is made of magnetic material is provided on the casing 17. An end 6a (a right end in the Figure) of the yoke 6 contacts with the outer end face of the flange 5a of the fixed core 5 and is fixed to the casing 17. The other end 6b (a left end in the Figure) extends in the direction of the axis of the fixed core 5 and reaches to the flow control part II. A plate 7 made of a magnetic material and extending radially of the core axis, is imbedded in the left end (as seen in the Figure) of the bobbin 18. A radial extension 7b of the plate 7 is secured in, and extends through the yoke 6. Near the center of the plate 7, a hole 7a having a diameter slightly larger than the inner diameter of the bobbin 18 is positioned coaxially with the bobbin 18. The wall of the plate 7 defining the hole 7a acts as an electro-magnetic bearing in the center hole 18b of the bobbin for a movable core 3, for assuring the axial movement thereof. The electro-magnetic solenoid 4 having the fixed core 5, the yoke 6 and the plate 7 forms an electro-magnetic circuit with the movable core 3.

On the left end of the fixed core 5 there is formed a concave part 5c extending into the fixed core 5 coaxially with the axis of the fixed core 5.

The flow control part 2 has a valve housing 13 having a first port or inlet 8 at relatively low pressure (preferably below-atmospheric pressure) and a second port or outlet 9 at relatively high pressure (preferably at atmospheric pressure). The right end (in the Figure) of the valve housing 13 is fixed to the left end (in the Figure) of the bobbin 18 of the electro-magnetic drive part I at a joint having a spacer 20. A cylindrical boss 21 is formed at a center of the inner side of the valve housing 13. At the end face (the right end in the Figure) of the boss 21, a valve seat face 22 is formed at the valve opening and has a narrower thickness in the radial direction than the remainder of the cylindrical wall of the boss 21.

A valve 1 formed into a substantially dished shape has a hole 1a at a center thereof. The outer circumferential part of the valve 1 is formed as an outer circular plate part 1b and the inner circumferential part of the valve 1 is formed as an inner circular plate part 1c. The outer and inner circumferential parts of the valve are connected by a slant part 1d. A rubber member 23 is fixed to both faces and the outer circumferential edge of the outer circular plate part 1b by a suitable means such as by pressing. Therefore, the valve 1 engages and disengages with the valve seat face 22 via the rubber member 23.

In the hole 1a of the inner circular plate 1c is inserted and fixed a small diameter part 3a of the movable core 3, the small diameter part 3a having the same diameter as the hole 1a. The movable core 3 is composed of the small diameter part 3a, a large diameter part 3b and a passage 11 extending through the center of the small and large diameter parts 3a, 3b so as to extend in the axial direction of the movable core 3. The passage 11 has a step 3c in the large diameter part 3b. A first or return spring 14 is positioned between the step 3c and the bottom of the concave part 5c of the fixed core 5. As a result, the movable core 3 is normally biased or forced to a closing position in sealing engagement with the valve seat face 22 by the return spring 14.

When the solenoid 4 is electrically excited, the movable core 3 is attracted to the fixed core 5 such that the end face of the movable core 3 moves away from the closing position and toward the end face of the fixed core 5. However, a clearance is always maintained or defined between the two end faces so that air can pass therethrough.

The inner circular plate part 1a of the valve 1 supports one end of a second or valve spring 15 which presses valve 1 in a direction away from the closing position on the valve seat face 22. The other end of the valve spring 15 is pressed against an adjustment screw 12 engaged with the valve housing 13. The adjustment screw 12 controls the force of the valve spring 15 in relation to the force of the return spring 14, to thereby precisely complement the magnetic attracting force of the electro-magnetic solenoid 4 so that the solenoid is able to move the valve 1 from the closing position.

The large diameter part 3b of the movable core 3 is inserted in the center hole 18b so as to maintain a slight clearance with respect to the wall face of the center hole 18b of the bobbin 18. This clearance is desirably formed to be as small as possible so as to minimize the magnetic-force loss in the magnetic circuit between the plate 7 and the movable core 3. As shown in the Figure, the outer circumference of the large diameter part 3b always faces the wall of the hole 7a of the plate 7 through the intervening wall of the bobbin 18.

A radially corrugated metal diaphragm 2 is a disc which extends radially between the bobbin 18 and the valve 18 so as to define a pressure chamber 10 between itself and the bobbin 18. The outer circumference of the diaphragm 2 is fluid tightly fixed in the wall of the bobbin 18. The diaphragm 2 has a center hole fitted on the small diameter part 3a of the movable core 3. The center hole of the diaphragm 2 has substantially the same diameter as the outer diameter of the small diameter part 3a of the movable core 3 and so the diaphragm 2 fits on the small diameter part 3a in a fluid tight manner. Therefore, between the movable core 3 and the diaphragm 2, no relative movement occurs in the radial direction of the diaphragm 2, and the diaphragm 2 and the movable core 3 are coaxially held relative to the bobbin 18. The stiffness of the diaphragm 2 prevents any excess stroke of the movable core 3 in the axial direction of the electro-magnetic solenoid 4. If the bobbin 18 is made from plastic, the diaphragm 2 may be fixed to the bobbin 18 by the insert forming method (i.e. imbedding) prior to the assembly of the valve.

A seal ring 24 also acts as a spacer and is interposed between the diaphragm 2 and valve 1. The valve 1 is fixedly mounted on the movable core 3 so as not to move in the axial direction thereof by means of a flange 3e which is formed by bending a distal end of the small diameter part 3a, a washer 25 and the seal ring 24 after mounting of the valve 1 and the diaphragm 2 on the small diameter part 3a. Air-communication across the diaphragm and relative movement between the diaphragm 2 and the valve 1 are thus prevented.

Atmospheric pressure at the outlet 9 flows to the pressure chamber 10 via the interior of the boss 21, the passage 11, the clearance between the movable core 3 and the fixed core 5 and the clearance between the wall of the center hole 18b of the bobbin 18 and the outer circumference face of the large diameter part 3b of the movable core 3. When the valve 1 is operated to move from the closing position on the valve seat face 22, the force by which the fluid pressure in the pressure chamber 10 acts on the diaphragm 2 and presses the movable core 3 to the left in the Figure is determined so as to be equal to the force by which the fluid pressure of the outlet 9 acts on the valve 1 and presses the movable core 3 to right in the Figure. In other words, the effective area of the diaphragm 2 is determined so as to be equal to the effective area of the valve-opening.

The function of the electro-magnetic proportional flow control valve will be detailed hereinafter.

In the closed condition of the valve as shown in the Figure, when the pressures of both the inlet 8 and the outlet 9 are atmospheric, the valve 1 is pressed onto the valve seat face 22 by the force difference between the spring forces of the return spring 14 and the valve spring 15, thereby closing the communication between the inlet 8 and the outlet 9. At this time, the atmospheric pressure at the outlet 9 is led to the pressure chamber 10. Thereby the atmospheric pressure is applied to both sides of the diaphragm 2, and opposing forces due to pressures across the diaphragm 2 are cancelled.

Next, when the pressure at the inlet 8 is negative pressure and the electro-magnetic solenoid 4 is turned off, no force is applied to the movable core 3 in the left direction. The pressure difference between the atmosphere and the negative pressure is applied to both sides of both the diaphragm 2 and the valve 1.

When an excitation current in the form of pulse waves is supplied to the electro-magnetic solenoid 4, while the pressure at the inlet 8 is a negative pressure, a magnetic force arises in proportion to the excitation current, thereby attracting the movable core 3 to the fixed core 5 in the axial of the bobbin 18 and removing the valve 1 from the valve seat face 22. Thereby communication between the inlet 8 and outlet 9 is established and the negative pressure at the inlet 8 is supplied to the pressure chamber 10 through the interior of the boss 21, the passage 11, the clearance between the movable core 3 and the fixed core 5 and the clearance between the wall of the center hole 18b of the bobbin 18 and the outer circumference of the large diameter part 3b of the movable core 3. Consequently, opposite negative pressures are applied to the front and back sides of both the diaphragm 2 and the valve 1, and fluid pressure forces on the valve 1 are cancelled.

In brief, since the fluid pressure in the pressure chamber 10 operates so as to cancel the forces acting on the valve 1 due to pressure difference between the two sides of the valve 1 immediately, even if the negative pressure supplied to the inlet 8 is changed, the control output of the electro-magnetic solenoid 4 remains stable. As a consequence, the magnetic force arising in proportion to the excitation current moves the valve 1 in the right direction to a position at which the spring forces of the solenoid and the valve spring 15 balance the return spring 14, which decides the valve open-degree of the flow control part 2 and decides the quantity of the air flow from the outlet 9 to the inlet 8 based entirely on the value of the excitation current.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. An electro-magnetic proportional flow control valve, comprising:

an electromagnet solenoid including a bobbin having an axial bore and a fixed core in said axial bore;

a valve housing defining a first port, a second port and a valve seat fluidically positioned between said first and second ports;

a valve normally in a closing position for closing said valve seat and interrupting fluid communication between said first and second ports;

a movable core fixed to said valve and positioned relative to said electro-magnetic solenoid such that said movable core is attracted to said fixed core upon excitation of said electro-magnetic solenoid to fluidically communicate said first and second ports;

an annular diaphragm positioned between said valve and said electro-magnetic solenoid and sealingly mounted to said movable core so as to form a fluid tight pressure chamber on a side of said diaphragm opposite said valve, wherein an outer circumference of said diaphragm is fixed relative to said axial bore of said bobbin, whereby said movable core is held in said axial bore and coaxial thereto by said diaphragm, and wherein said diaphragm comprises a corrugated metal disc having a center hole, said disc having an outer circumference sealingly imbedded in a wall of said bobbin and being sealingly mounted to said movable core via said center hole; and a passage in said movable core for fluidically communicating said pressure chamber with said second port, whereby forces acting on said valve due to pressure differences across said valve are cancelled.

2. The valve of claim 1 wherein said pressure chamber has an effective area equal to an effective area of an opening defined by said valve seat.

3. The valve of claim 1 wherein said diaphragm is made of metal.

4. The valve of claim 1 wherein said movable core is supported only by said diaphragm.

5. The vale of claim 1 wherein a side of said diaphragm opposite said pressure chamber is in fluid communication with said first port when said valve is in said closing position.

6. An electro-magnetic proportional flow control valve, comprising:

an electromagnetic solenoid including a bobbin having an axial bore and a fixed core in said axial bore;

a valve housing defining a first port, a second port and a valve seat fluidically positioned between said first and second ports;

a valve normally in a closing position for closing said valve seat and interrupting fluid communication between said first and second ports;

a movable core fixed to said valve and positioned relative to said electro-magnetic solenoid such that said movable core is attracted to said fixed core upon excitation of said electro-magnetic solenoid to fluidically communicate said first and second ports;

an annular diaphragm positioned between said valve and said electro-magnetic solenoid and sealingly mounted to said movable core so as to form a fluid tight pressure chamber on a side of said diaphragm opposite said valve;

a passage in said movable core for fluidically communicating said pressure chamber with said second port, whereby forces acting on said valve due to pressure differences across said valve are cancelled;

a first spring positioned between said fixed and movable cores for biasing said valve into said closing position for closing said valve seat;

a second spring positioned for urging said valve away from said closing position; and means for adjusting a force necessary for moving said valve from said closing position, wherein said adjusting means comprises a displaceable member, said second spring extending between said displaceable member and said valve.

7. The valve of claim 6 wherein said displaceable member is a screw threaded in said valve housing.

* * * * *